Nov. 4, 1924.

H. F. HITNER

APPARATUS FOR INSPECTING PLATE GLASS

Filed March 27, 1924 3 Sheets-Sheet 1

1,514,386

INVENTOR
Harry F Hitner
by
James C. Bradley
atty

Nov. 4, 1924.
H. F. HITNER
1,514,386
APPARATUS FOR INSPECTING PLATE GLASS
Filed March 27, 1924   3 Sheets-Sheet 2
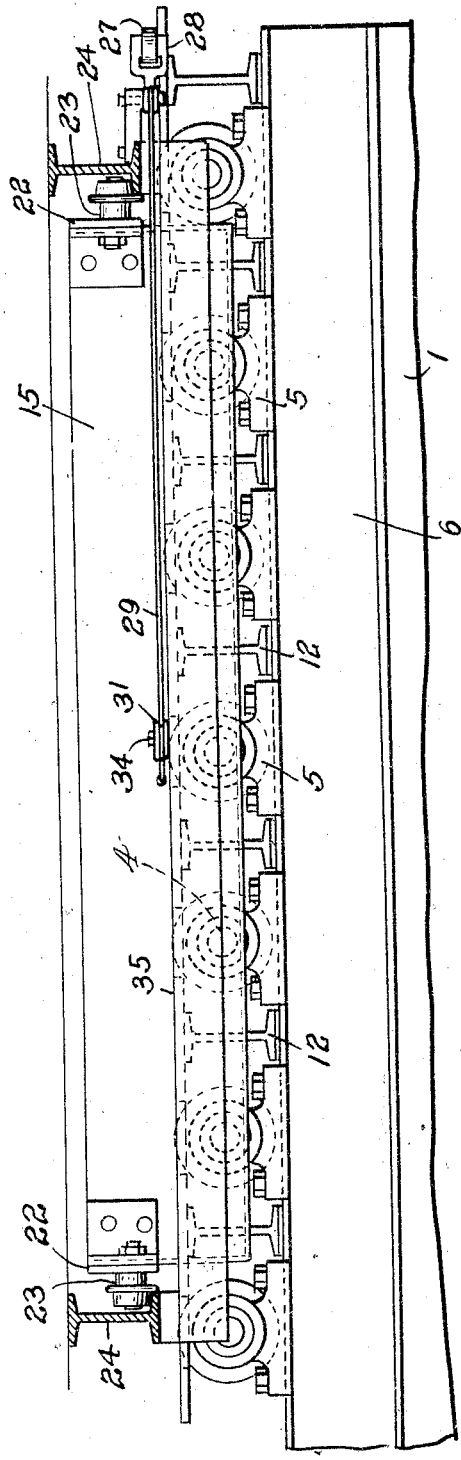
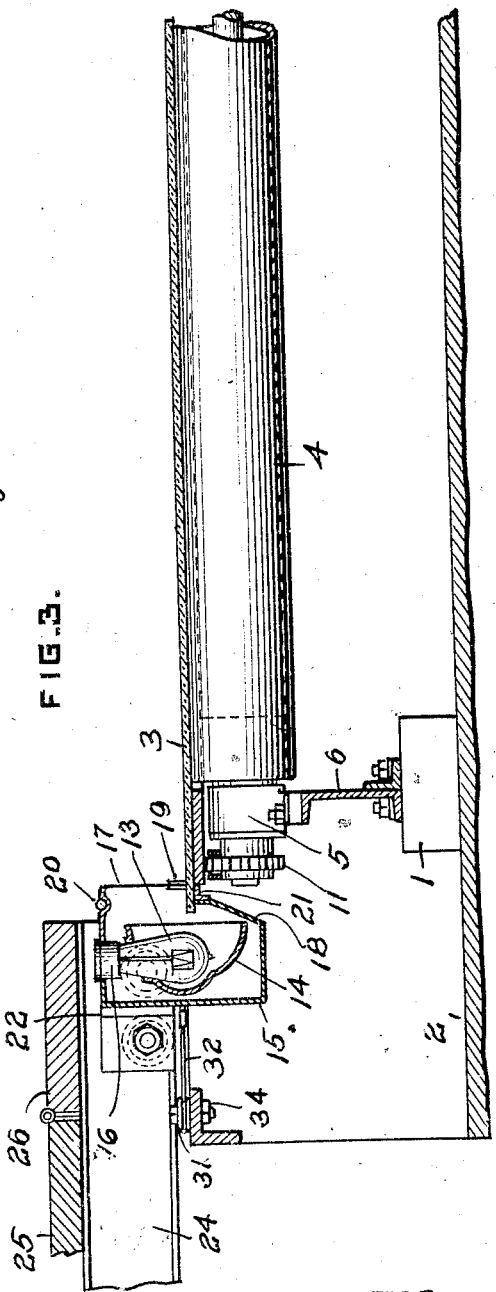
INVENTOR
Harry F Hitner
by
James C Bradley
atty Nov. 4, 1924.

H. F. HITNER 1,514,386

APPARATUS FOR INSPECTING PLATE GLASS

Filed March 27, 1924    3 Sheets-Sheet 3

INVENTOR
Harry F Hitner
by
James G. Bradley
atty

Patented Nov. 4, 1924.

1,514,386

UNITED STATES PATENT OFFICE.

HARRY F. HITNER, OF PITTSBURGH, PENNSYLVANIA, ASSIGNOR TO PITTSBURGH PLATE GLASS COMPANY, A CORPORATION OF PENNSYLVANIA.

APPARATUS FOR INSPECTING PLATE GLASS.

Application filed March 27, 1924. Serial No. 702,259.

*To all whom it may concern:*

Be it known that I, HARRY F. HITNER, a citizen of the United States, and a resident of Pittsburgh, in the county of Allegheny and State of Pennsylvania, have made a new and useful invention in Improvements in an Apparatus for Inspecting Plate Glass, of which the following is a specification.

Figure 1:
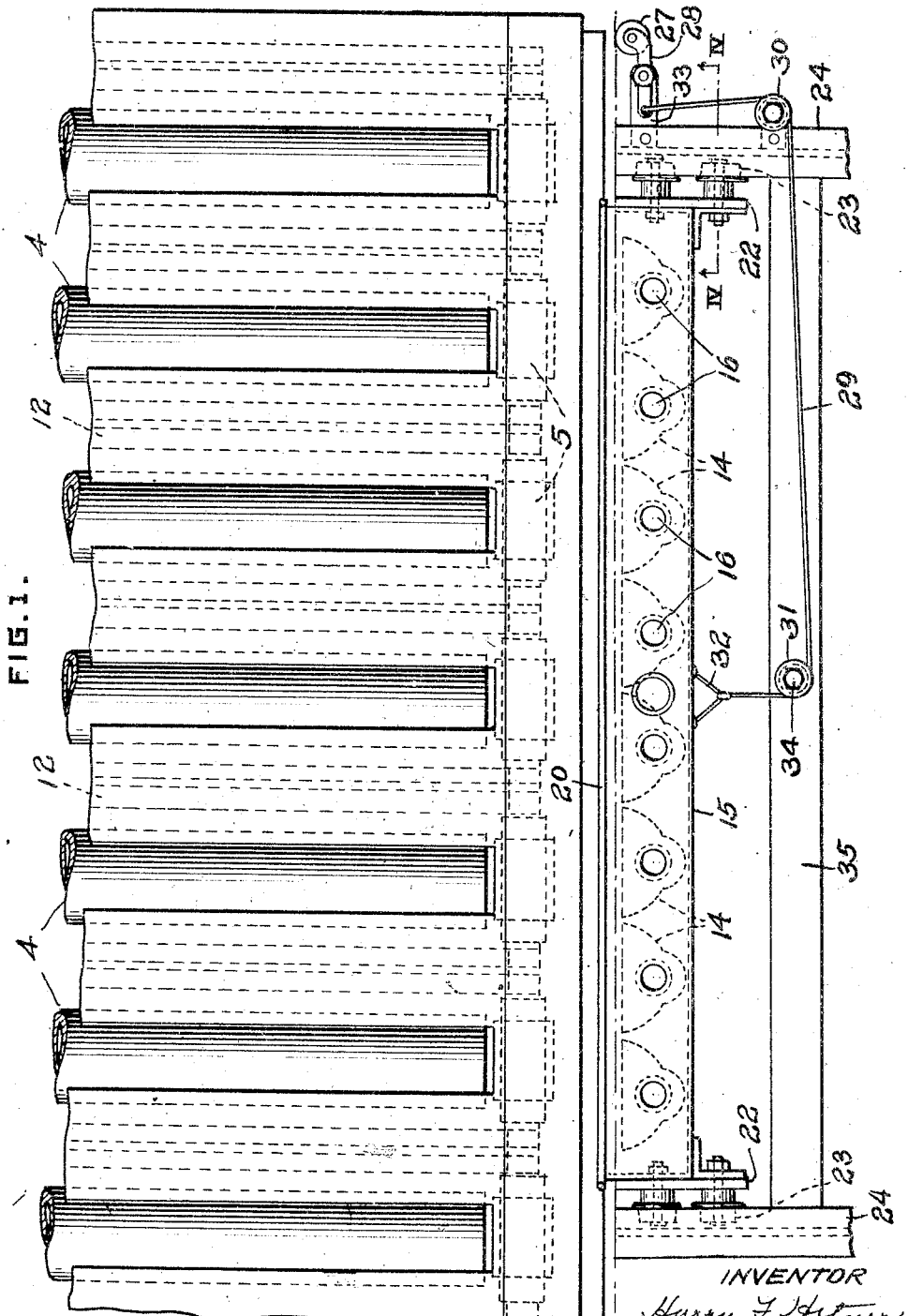
Figure 4:
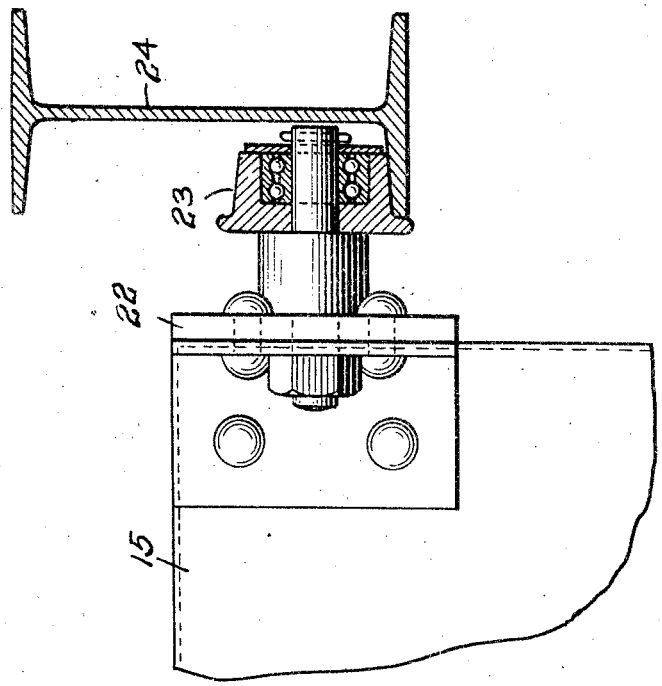
Figure 5:
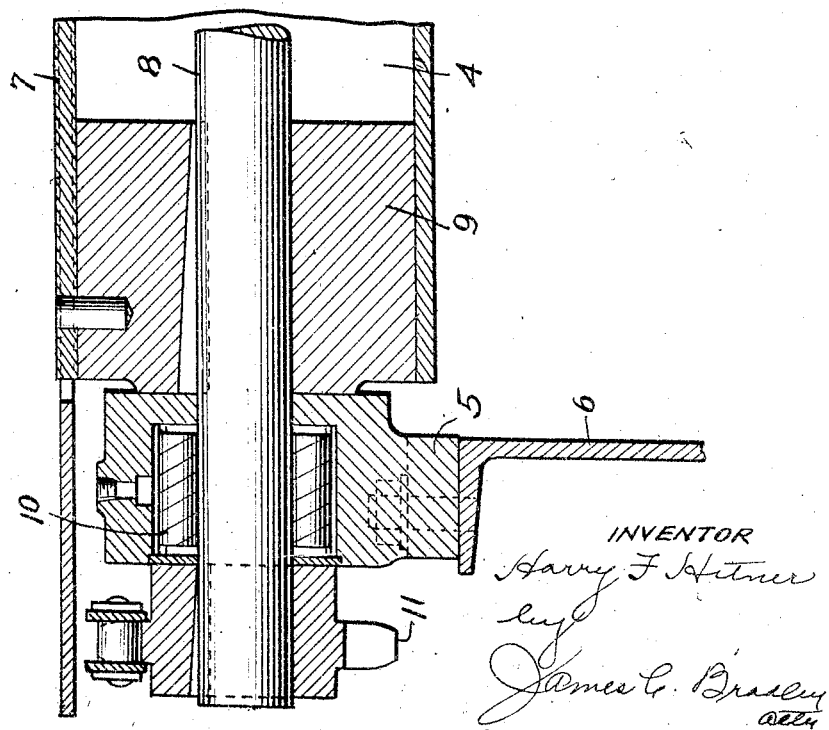

The invention relates to apparatus for inspecting plate glass as it is formed and annealed in a continuous process, such as that disclosed in the Gelstharp application, Serial Number 656,441. In such an operation, the continuous sheet or ribbon, after passing through an annealing leer, is cut into sections of suitable length as it emerges from the leer and placed in storage racks. The present invention relates to the means employed for inspecting the glass, so that the defects may be noted and marked (with chalk) preliminary to cutting off the sections in such a way as to eliminate parts containing defects, and as a guide in sorting the sections after they are cut off. The invention has for its principal objects the provision of improved means for illuminating the glass and facilitating the work of the inspector, who occupies a position above the glass and ordinarily stands upon the sheet above the area of illumination in performing his duties. One embodiment of the invention is illustrated in the accompanying drawings wherein:

Figure 1 is a partial plan view of the apparatus. Fig. 2 is a side elevation, partially, in section. Fig. 3 is a transverse section. And Figs. 4 and 5 are detail sections; Fig. 4 being taken on the line IV—IV of Fig. 1, and Fig. 5 being taken longitudinally of one of the table rollers opposite to the ends shown in Fig. 1.

The table for receiving the glass is located at the outlet end of the leer upon a substructure comprising longitudinally extending members 1 and transverse members 2 as indicated in Fig. 3, a sufficient space being preferably provided between the leer and the table so that the glass is cooled to such an extent that the operator can stand with comfort upon the glass sheet 3 passing over the table. The table preferably consists of a plurality of rolls 4 mounted upon spaced bearings 5 carried by the longitudinally extending channels 6, the latter being carried by the substructure heretofore referred to. The rollers preferably consist of cylinders 7 (Fig. 5) carried upon shafts 8, the latter being connected to the cylinders 7 by means of the blocks 9 at each end. Roller bearings 10 are preferably employed and at one end of the shafts sprockets 11 are employed by means of which the rollers are turned. These sprockets are at the ends of the rolls remote from the ends shown in Figs. 1 and 3.

Intermediate the rollers 4, as indicated in Fig. 2, are a series of transverse I beams 12 supported upon the channels 6 and having their upper sides in contact with or closely adjacent to the surface of the glass. These means serve to guard the operator, who is standing or kneeling upon the sheet, from injury in case the glass should break, and they tend to prevent breakage due to the weight of the operator, although the glass is sufficiently strong to normally support the weight of the operator with the rollers spaced as shown.

By reference to Fig. 3, it will be noted that the length of the rollers 4 is less than the width of the sheet 3, so that the edges project out past the end of the rolls. This is to give opportunity for the application of the illuminating devices provided along the sides of the sheet. The illuminating devices consist of a plurality of incandescent lights 13 mounted in the reflectors 14 and carried by the compartments 15. These compartments are preferably of approximate rectangular cross section (Fig. 3) and are made of sheet metal. The lamps 13 are carried in suitable sockets 16 mounted in the top walls of the compartments and serving also to support the reflectors. The reflectors are so designed as to project as much light as possible laterally into the edges of the sheet and an illumination of the sheet, sufficient for very accurate inspection, is thus provided clear to the center of the sheet. This illumination necessarily decreases in intensity from the edge of the sheet to the center, but as applied has been found sufficient for the proper inspection of a sheet which is 72" in width.

In order that there may be no interference by reason of the light projected from the reflectors above and below the glass sheet, the curtains or shields 17 and 18 are provided. The shield 17 is of cloth provided with metal strips 19 for weighting it at its lower edge and is releasably secured to the top wall of the compartment 15 as indicated in Fig. 3. A longitudinal groove or recess adjacent the edge of the top wall of the compartment is provided over which the upper edge of the curtain 17 is stretched and a solid metal rod 20 is then applied, serving by its weight to hold the curtain in position. The lower shield 18 is of sheet metal provided at its upper edge with an angle 21 which either touches or is very closely adjacent the lower surface of the glass sheet.

As a matter of convenience, the compartments 15 are mounted so that they may be moved toward and from the table. This serves the purpose of adjustment to position the light and reflector to the best advantage for illumination, and gives access to the bearings at the ends of the rollers for the purpose of inspection, repair or replacement. In order to give the movable support for the compartment, the ends are provided with the plates 22, each carrying a pair of rollers 23 (Fig. 1) and these rollers are supportd upon the transverse I beams 24 so that the compartments may be very easily moved in and out and adjusted. The compartments are placed beneath the floor 25 (Fig. 3) and access is given to the parts beneath by means of the hinged doors 26 which rest on the beams 24 when in closed position.

In operation, the glass moves slowly over the table and the inspector stands or kneels on the glass and marks with chalk the defects which he observes in the sheet beneath, such as, bubbles, ream and the like. He may also perform the duty of cutting the sheet. The lengths into which the continuous sheet is cut would ordinarily be uniform, but when defects of a certain character are found upon the sheet, it may be desirable for the inspector to cut out a strip containing the defect. The lamps along the edges of the sheet in connection with the reflectors give an illumination through the sheet which meets the requirements for inspection, this effect being augmented by the use of the shields 17 and 18, particularly the shield 17, which is practically an essential. The table is also enclosed in a darkened compartment which still further assists in making the illumination of the sheet effective for inspection purposes. Means are provided for causing the compartments 15 to move outward (away from the center line of the sheet) when the glass sheet widens out or shifts bodily to one side. This means comprises the grooved rollers 27 (Fig. 1) carried by the levers 28 and the cables 29 passing around pulleys 30 and 31 and connected to the rear sides of the compartments as indicated at 32. The arms 28 are mounted on brackets 33 carried by the I beams 24, the pulleys 30 also being carried by brackets secured to such I beams, while the pulleys 31 are carried by bolts 34 extending through the angle irons 35. The latter is secured at its ends to the I beams 24. After the compartments have once been moved outward from their normal positions by the sheet of glass, they are moved back to such position by the operator, who is in position to observe whether the rollers 27 contact with the edges of the sheet.

What I claim is:

1. Apparatus for inspecting a continuously formed forwardly moving sheet or ribbon of glass, comprising a table over which the glass passes of less width than that of the sheets so that the edges of the sheet project out past the sides of the table, a shielding compartment extending along each side of the table and each having a slot in its side through which the edge of the sheet projects, and illuminating means in the compartments adapted to project light laterally through the edges of said sheet.

2. Apparatus for inspecting a continuously formed forwardly moving sheet or ribbon of glass, comprising a table over which the glass passes of less width than that of the sheet, so that the edges of the sheet project out past the sides of the table, a shielding compartment extending along each side of the table and each having a slot in its side through which the edge of the sheet projects, and illuminating means in the compartments adapted to project light laterally through the edges of said sheet, the said compartments being mounted for movement toward and from the table.

3. Apparatus for inspecting a continuously formed forwardly moving sheet or ribbon of glass, comprising a table over which the glass passes of less width than that of the sheet, so that the edges of the sheet project out past the sides of the table, a shielding compartment extending along each side of the table and also extending up above the level of the table into which the edge of the sheet projects, a shield or curtain closing the side of each compartment above the glass and extending down to the surface of the glass sheet and illuminating means in the compartments adapted to project light laterally through the edges of the sheet.

4. Apparatus for inspecting a continuously formed forwardly moving sheet or ribbon of glass, comprising a table over which the glass passes of less width than that of the sheet, so that the edges of the sheet project out past the sides of the table, a shielding compartment extending along each side of the table, and also extending up above the level of the table into which the edge of the sheet projects, and lying partly above and partly below the level of the top of the table, a shield closing the side of each compartment above the glass sheet and extending down to the upper surface of the glass, a shield closing the side of each compartment below the glass and extending up to the lower surface of the glass sheet and illuminating means in the compartments adapted to project light laterally through the edges of said sheet.

5. Apparatus for inspecting a continuously formed forwardly moving sheet or ribbon of glass, comprising a table over which the glass passes, means for projecting light laterally into the edges of the sheet, and a curtain at each side of the table extending upward from the surface of the sheet.

6. Apparatus for inspecting a continuously formed forwardly moving sheet or ribbon of glass, comprising a table over which the glass passes, consisting of a plurality of spaced rollers, means for projecting light laterally into the edges of the sheet, and supporting members in the spaces between the rollers and extending transversely of the table beneath the glass sheet.

7. Apparatus for inspecting a continuously forwardly moving sheet or ribbon of glass, comprising a table over which the glass passes of less width than the sheet so that the edges of the sheet project out past the sides of the table, a shielding compartment extending along each side of the table mounted for movement toward and from the longitudinal center line of the table and each having a slot in its side through which the edge of the sheet projects, illuminating means in the compartments adapted to project light laterally through the edges of the sheet, and means co-acting between the edge of the sheet and the compartments to regulate the position of the compartments.

In testimony whereof, I have hereunto subscribed my name this 24th day of March, 1924.

HARRY F. HITNER.